(12) United States Patent
Nagarkar et al.

(10) Patent No.: US 8,495,316 B2
(45) Date of Patent: Jul. 23, 2013

(54) EFFICIENT MANAGEMENT OF ARCHIVAL IMAGES OF VIRTUAL MACHINES HAVING INCREMENTAL SNAPSHOTS

(75) Inventors: Kuldeep S. Nagarkar, Pune (IN); Timothy M. Naftel, Longmont, CO (US)

(73) Assignee: Symantec Operating Corporation, Mountain View, CA (US)

( * ) Notice: Subject to any disclaimer, the term of this patent is extended or adjusted under 35 U.S.C. 154(b) by 1049 days.

(21) Appl. No.: 12/197,672

(22) Filed: Aug. 25, 2008

(65) Prior Publication Data
US 2010/0049929 A1 Feb. 25, 2010

(51) Int. Cl.
*G06F 12/00* (2006.01)

(52) U.S. Cl.
USPC .................................. 711/162; 711/E12.103

(58) Field of Classification Search
USPC .......................................... 711/162, E12.103
See application file for complete search history.

(56) References Cited

U.S. PATENT DOCUMENTS

| | | | |
|---|---|---|---|
| 6,397,229 B1 * | 5/2002 | Menon et al. ................. | 707/641 |
| 6,675,177 B1 * | 1/2004 | Webb .................................... | 1/1 |
| 7,093,086 B1 | 8/2006 | van Rietschote | |
| 7,370,164 B1 * | 5/2008 | Nagarkar et al. ............. | 711/162 |
| 7,606,868 B1 * | 10/2009 | Le et al. ........................ | 709/211 |
| 2005/0108486 A1 * | 5/2005 | Sandorfi ........................ | 711/162 |
| 2006/0041727 A1 * | 2/2006 | Adkins et al. ................. | 711/162 |
| 2006/0053259 A1 * | 3/2006 | Berkowitz et al. ............ | 711/162 |
| 2007/0239944 A1 * | 10/2007 | Rupanagunta et al. ....... | 711/147 |
| 2010/0011178 A1 * | 1/2010 | Feathergill .................... | 711/162 |

OTHER PUBLICATIONS

Microsoft, "Virtualization for Windows: A Technology Overview," David Chappell, Chappell & Associates, Jul. 2007.
Microsoft, "Windows Server Virtualization—An Overview," May 2006.
U.S. Appl. No. 11/009,108, filed Dec. 10, 2004.
"What is Volume Shadow Copy Service?," Microsoft Corporation, 2004, 5 pages, Aug. 2004.
"Virtualization from the Datacenter to the Desktop; Building a Comprehensive, end-end virtualization strategy," 2007 Core Infrastructure Optimization, Microsoft Corporation 2007, 15 pages, Oct. 25, 2007.

* cited by examiner

*Primary Examiner* — Larry Mackall
(74) *Attorney, Agent, or Firm* — Lawrence J. Merkel; Meyertons, Hood, Kivlin, Kowert & Goetzel, P.C.

(57) ABSTRACT

In one embodiment, a backup application is disclosed which is configured to detect that one or more incremental virtual disk files are provided in a virtual machine image. The backup application may invoke a merge function in the virtual machine monitor, and may merge the incremental virtual disk files into the base virtual disk file. Redundant data is thus eliminated, and may reduce the amount of archive media needed to store the backed-up virtual machine image.

18 Claims, 5 Drawing Sheets

EFFICIENT MANAGEMENT OF ARCHIVAL IMAGES OF VIRTUAL MACHINES HAVING INCREMENTAL SNAPSHOTS

BACKGROUND

1. Field of the Invention

This invention is related to the field of virtual machines and archiving virtual machine snapshots.

2. Description of the Related Art

Virtual machines have a variety of uses in computer systems. For example, virtual machines are used to provide several users with concurrent access to a single physical computer system. Each user executes applications in a different virtual machine, and the virtual machines are scheduled for execution on the computer system hardware. The processing power of the computer system can be more effectively utilized by providing multiple virtual machines on the computer system. Additionally, user's activities are protected from the operation of other user's programs via the division into virtual machines. Virtual machines can also be used during software development to test the software on various hardware configurations (e.g. each hardware configuration is represented by a differently-configured virtual machine). Virtual machines can be used to consolidate tasks that were previously running on separate computer systems by assigning each task to a virtual machine and running the virtual machines on fewer computer systems. There are many other uses for virtual machines as well.

Because of their usefulness, virtual machines are being deployed more frequently across the computing spectrum. Additionally, the continued increase in processing power that is available on a single computer system (and especially on larger server systems) makes the overhead of the virtual machine less noticeable to the user, and permits more virtual machines to be executed on a single computer system. Cost savings may be realized by requiring fewer physical computer systems to provide the needed processing power for a given set of users.

Computer systems, and their components, are subject to various failures which may result in the loss of data. For example, a storage device used by the computer system may experience a failure (e.g. mechanical, electrical, magnetic, etc.) which may make any data stored on that storage device unreadable. Erroneous software or hardware operation may corrupt the data stored on a storage device, destroying the data stored on an otherwise properly functioning storage device. Any component in the storage chain between (and including) the storage device and the computer system may experience failure (e.g. the storage device, connectors (e.g. cables) between the storage device and other circuitry, the network between the storage device and the accessing computer system (in some cases), etc.).

To mitigate the risk of losing data, computer system users typically make backup copies of data stored on various storage devices. In the case of virtual machines, it is generally possible to make a backup copy (snapshot) of the entire virtual machine state. Multiple snapshots may be created over a relatively short period of time (e.g. one day) in order to meet recovery point objectives (RPOs) established by the user or administrator of the virtual machine. To save time in creating these snapshots, some virtual machine monitors (e.g. Hyper-V from Microsoft corporation) freeze the state of the virtual disks in the virtual machine and create new incremental virtual disks for subsequent write operations. These snapshots can be archived.

SUMMARY

In one embodiment, a backup application is disclosed which is configured to detect that one or more incremental virtual disk files are provided in a virtual machine image that is to be archived. The backup application may invoke a merge function in the virtual machine monitor, and may merge the incremental virtual disk files into the base virtual disk file. Redundant data is thus eliminated, and may reduce the amount of archive media needed to store the backed-up virtual machine image.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
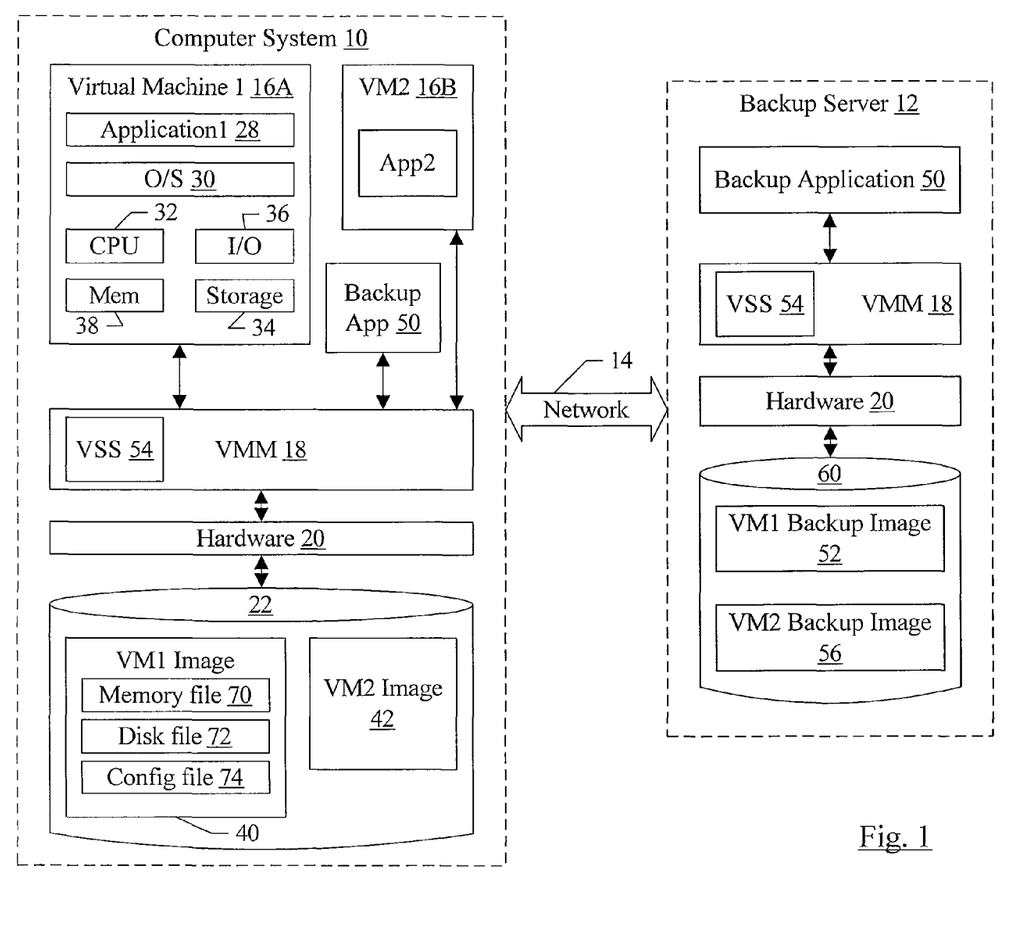
FIG. 1 is a block diagram of one embodiment of a system including a computer system having one or more virtual machines and optionally a backup server.

Turning now to FIG. 1, a block diagram of one embodiment of a system including a computer system 10 and a backup server 12 coupled via a network 14 is shown. Thus, in the illustrated embodiment, the computer system 10 and the backup server 12 are separate computer systems. The computer system 10 includes one or more virtual machines (e.g. virtual machines 16A-16B as illustrated in FIG. 1). The virtual machines are controlled by a virtual machine monitor (VMM) 18. The virtual machines 16A-16B and the VMM 18 may comprise software and/or data structures. The software may be executed on the underlying hardware in the computer system 10 (e.g. the hardware 20). The hardware may include any desired circuitry. For example, the hardware may include one or more processors, or central processing units (CPUs), storage, and input/output (I/O) circuitry. In the embodiment of FIG. 1, the computer system 10 includes a storage device 22. The storage device 22 may be part of the hardware 20, but is shown separately in FIG. 1 to illustrate certain data stored thereon. In addition, FIG. 1 illustrates a backup application 50 on the computer system 10, and a volume shadow copy service (VSS) 54 in the VMM 18. The backup application 50 may also be included on the backup server 12, or may be only on the backup server 12, in various embodiments described in more detail below.

As shown in FIG. 1, each application executing on the computer system 10 executes within a virtual machine 16A-16B. Generally, a virtual machine comprises any combination of software, one or more data structures in memory, and/or one or more files stored on a storage device (such as the storage device 22). Under the control of the VMM 18, the virtual machine mimics the hardware used during execution of a given application that is encapsulated by the virtual machine. For example, in the virtual machine 16A, an application 28 is shown. The application 28 is designed to execute on the operating system (O/S) 30. Both the application 28 and the O/S 30 are coded with instructions executed by the virtual CPU 32. Additionally, the application 28 and/or the O/S 30 may make use of virtual memory 38, one or more virtual storage devices 34, and virtual input/output (I/O) such as devices 36. The virtual storage may mimic any type of storage, such as disk storage, tape storage, etc. The disk storage may be any type of disk (e.g. fixed disk, removable disk, compact disc read-only memory (CD-ROM), rewriteable or read/write CD, digital video disk (DVD) ROM, read/write DVD, rewriteable DVD, etc.). Each virtual disk storage in the virtual machine may be mapped to a file or files on a storage device such as the storage device 22. The virtual I/O devices may mimic any type of I/O devices, including modems, audio devices, video devices, network interface controller (NICs), universal serial bus (USB) ports, firewire (IEEE 1394) ports, serial ports, parallel ports, etc. Generally, each virtual I/O device may be mapped to a corresponding I/O device in the underlying hardware or may be emulated in software (e.g. the VMM 18) if no corresponding I/O device is included in the underlying hardware.

The virtual machine in which an application is executing encapsulates the application (and its O/S) and encompasses the entire system state associated with the application. Generally, when a virtual machine is active (i.e. the application within the virtual machine is executing on the hardware 20), the virtual machine may be stored in the memory of the computer system on which the virtual machine is executing (although the VMM may support a paging system in which various pages of the memory storing the virtual machine may be paged out to local storage in the computer system) and in the files which are mapped to the virtual storage devices in the virtual machine. The VMM may support a command to suspend the virtual machine. In response to the command, the VMM may write an image of the virtual machine to the storage device 22 (e.g. the images 40 and 42 shown in FIG. 1), capturing the current state of the virtual machine and thus implicitly capturing the current state of the executing application. The image may include one or more files written in response to the suspend command, capturing the state of the virtual machine that was in memory in the computer system, as well as the files representing the virtual storage in the virtual machine. The state may include not only files written by the application, but uncommitted changes to files which may still be in the memory within the virtual machine, the state of the hardware (including the processor 32, the virtual memory 38, etc.) within the virtual machine, etc. Thus, the image may be a snapshot of the state of the executing application. A suspended virtual machine may be resumed using a resume command supported by the VMM. In response to the resume Is command, the VMM may read the image of the suspended virtual machine from the storage device and may activate the virtual machine in the computer system.

The image 40 of the virtual machine 16A is illustrated in greater detail in FIG. 1 for one embodiment. In the illustrated embodiment, the image 40 includes a memory file 70, a disk file 72, and a configuration file 74. The memory file 70 may include the state of the virtual memory 38 in the virtual machine 16A. The configuration file 74 may store information describing the configuration of the CPU. For example, the configuration file 74 may store virtual memory size, number of CPUs 32 and type, I/O device configuration such as NIC configuration for the NIC 36A, number, type, and size of virtual storage devices, etc. Additionally, the configuration file 74 (or another file) may store any virtual hardware state that may be saved (e.g. the state of the virtual CPU 32, etc.). The disk file 72 may be the virtual disk file. A disk file 72 may be provided for each virtual disk or other virtual storage device 34 in the virtual machine. Generally, the disk file stores data that has been written to the virtual storage device. For example, in one embodiment, the file may be arranged by disk block and a given block may be written to its corresponding location in the file according to block number. In another embodiment, the disk file or a related file may map disk blocks to locations in the file. While one disk file 72 is shown in the illustrated embodiment, more than one disk file may represent a virtual storage device 34 in other embodiments.

In one embodiment, the VMM 18 may be part of the Hyper-V product provided by Microsoft Corporation. In such embodiments, the disk file 72 may be a file having the file extension "vhd". In addition to creating or updating the image in response to a suspend, other mechanisms may be provided for creating snapshots. For example, as mentioned previously, the VMM 18 may comprise the VSS 54 (or, in embodiments in which the VMM 18 comprises a hypervisor executing on an underlying host OS, the VSS 54 may be part of the host OS). In VSS, the writers of a given volume are identified, and VSS may communicate with the writers to "quiet" the writers (in which the writers complete their in-progress writes to a volume and temporarily close any open files on the volumes). Once the writers are quieted, the volumes may be in a consistent state and may permit snapshotting of the volume. The VSS 54 is described in more detail below.

In the context of virtual machines 16A-16B, the virtual machine is a writer of the volume on which the disk files are created. Thus, to create a snapshot of the virtual storage, the VSS 54 may be used by the backup application 50 to generate a snapshot. Another mechanism to create a snapshot of the virtual storage 34 in the Hyper-V product is to request the snapshot through the server management interface of the Hyper-V product.

The backup application 50 may thus request snapshots of the VM 16A-16B's virtual storage 36 periodically during operation of the computer system 10, in order to provide enough granularity to meet recovery point objectives for the virtual machines 16A-16B. For example, if the recovery point objective is set at 30 minutes (meaning recovery is expected to be possible to within 30 minutes of a selected previous time point at which the recovery is desired), then a snapshot may be taken every 30 minutes.

In one embodiment, each snapshot request causes the VMM 18 to freeze the disk file that is currently being written to by the virtual machine 16A-16B and to create a new (incremental) disk file that is written by subsequent writes by the virtual machine to the virtual disk. The first snapshot request causes the initial disk file (the vhd file referred to above) to be frozen, and a first incremental disk file to be created. Incremental disk files have the file extension "avhd", in one embodiment. Subsequent snapshot requests cause the current incremental disk file to be frozen and a new incremental disk file to be created. Accordingly, recovery to a selected time point may be performed by recovering the initial disk file and the incremental disk files prior to the selected time. In some cases, the incremental disk file immediately following the selected time point may also be recovered (e.g. if the selected time point is near the subsequent time point, such as more than half way between the previous time point and the subsequent time point or within a specified number of minutes of the subsequent time point).

Figure 2:
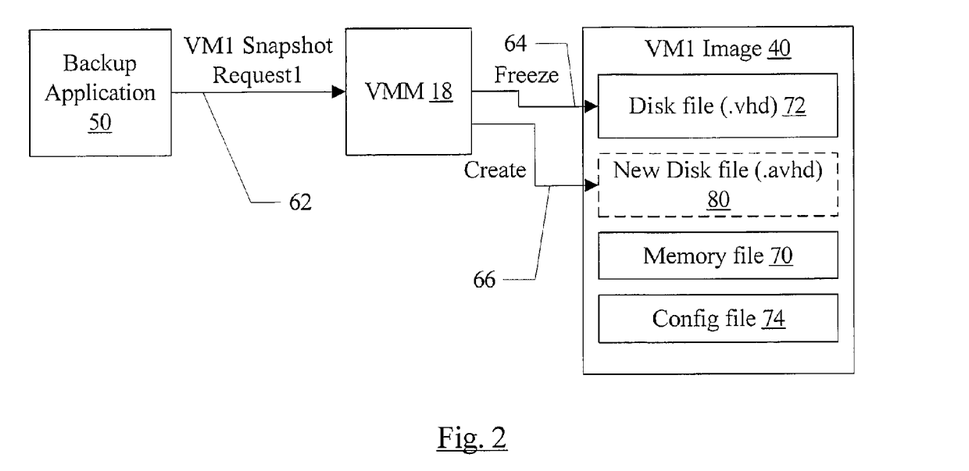
FIG. 2 is a block diagram illustrating one embodiment of the creation of a first snapshot of a virtual machine.
Figure 3:
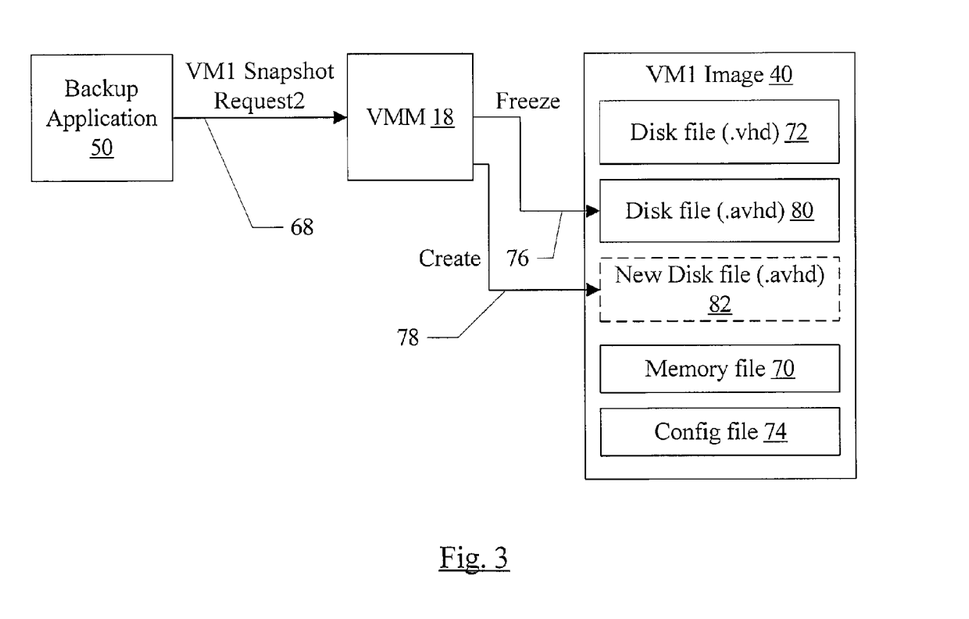
FIG. 3 is a block diagram illustrating one embodiment of the creation of a second snapshot of a virtual machine.

FIGS. 2 and 3 illustrate an example of the above operation for two snapshot requests. Illustrated in each of FIGS. 2 and 3 are the backup application 50, the VMM 18, the VM1 image 40 including the disk file 72, the memory file 70, and the configuration file 74. In FIG. 2, the backup application 50 transmits a first snapshot request to the VMM 18 (arrow 62). In response, the VMM 18 may freeze the disk file 72 (the vhd file, in this example—arrow 64) and may create a new disk file 80 (an avhd file—arrow 66). Generally, freezing a file may refer to preventing any additional writes to the file. The file may be read, but not written. Accordingly, the contents of the file are available to be read (e.g. a block of the virtual disk that has not been changed since the freeze may be read from the frozen file), but the state of the entire virtual disk at the time of the freeze may be available in the file (since subsequent writes are directed to another file). If a block of the virtual disk is written subsequent to the freeze, it is written to the new incremental disk file 80 (and subsequent reads will read the updated block from the incremental disk file 80, rather than the previous state of the block in the frozen virtual disk file 72).

FIG. 3 illustrates an example of the new snapshot request transmitted by the backup application 50 (arrow 68). In response to the request, the VMM 18 freezes the incremental disk file 80 (arrow 76) and creates a new incremental disk file 82. Accordingly, after the two snapshots, there are two recovery points available in addition to the current state of the virtual disk: (i) the point represented by the disk file 72; and (ii) the point represented by the combination of the disk file 72 and the incremental disk file 80.

Creating snapshots in the above fashion may provide a rapid snapshot that may have minimal impact on the executing virtual machine 16A-16B. Accordingly, the recovery point objective may be met for the virtual machines 16A-16B. However, the disk file 72 and the incremental disk files 80 contain some redundant data with respect to Is the current state. The original disk file 72, containing the state of each block of the virtual disk (or at least capable of providing a value in response to a read of any block of the virtual disk, where random data or zeros may be supplied in the event of a read to a block that has not been written) is referred to herein as the base virtual disk file. Each block of the virtual disk that is contained in the base virtual disk file and is also represented in one or more incremental disk files is redundant data to the current state. Each incremental disk file (e.g. files 80 and 82) is referred to as an incremental virtual disk file and contains blocks that were written to the virtual disk in the time period between the creation of the that incremental disk file and its subsequent freeze by the VMM 18. Blocks of the virtual disk in the incremental virtual disk file that were subsequently written to (in a subsequent incremental virtual disk file) are also redundant data.

Figure 4:
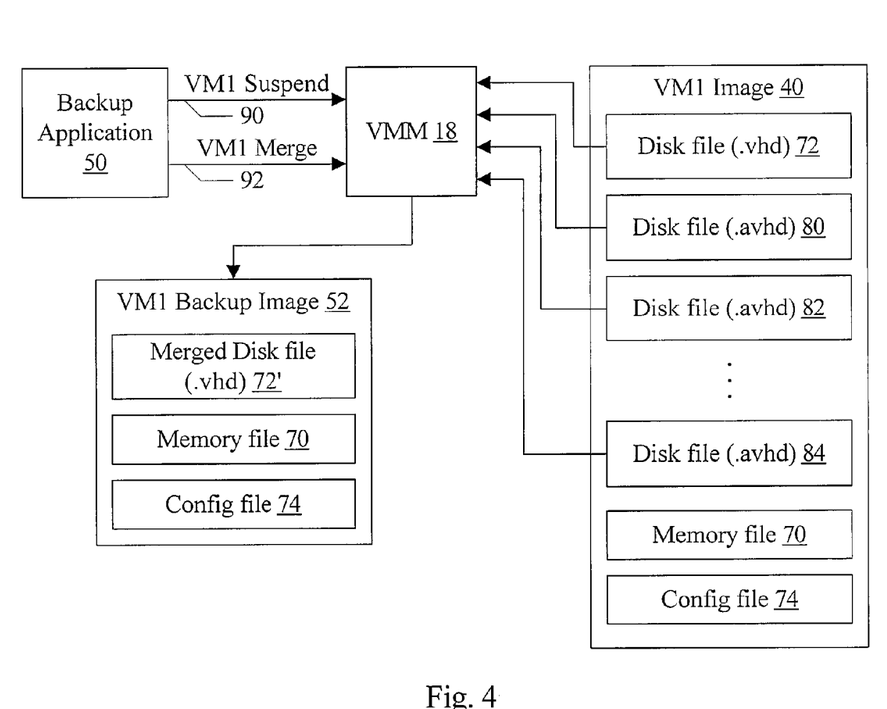
FIG. 4 is a block diagram illustrating one embodiment of the archival of the virtual machine snapshot.

In addition to requesting the snapshots to meet the RPO objective, the backup application 50 is configured to perform a backup of one or more virtual machines 16A-16B. The backup application 50 may use the VMM's suspend capability to obtain the virtual machine image 40 or 42 (arrow 90). In response to the suspend of the virtual machine 16A, the VMM 18 may update the virtual machine image 40 with the current state of the virtual machine (e.g. the memory file 70 and the configuration file 74). The image 40 in FIG. 4 assumes that one or more snapshots of the virtual disk have been created. In FIG. 4, the base virtual disk file 72 is included along with multiple incremental virtual disk files 80, 82, and 84. As indicated by the ellipses between the incremental disk files 82 and 84, there may be more incremental disk files. Additionally, there may be zero, one, or two incremental disk files. In general, the number of incremental disk files may be equal to the number of snapshots of the virtual disk that have been created and maintained in the computer system 10.

As mentioned above, there is redundant data in the base virtual disk file and possibly in the incremental virtual disk files. The VMM 18 may support a merge function to merge incremental virtual disk files into the base virtual disk file. The backup application 50 may invoke the merge function (arrow 92). In response to the invocation of the merge, the VMM 18 may load the base virtual disk file and the incremental virtual disk files and perform the merge. The resulting merged disk file 72' (with the incremental disk files merged) may be part of a backup virtual image 52 along with the memory file 70 and configuration file 74. Because the redundant data has been eliminated, the backup image 52 may be smaller than the image 40. Accordingly, less archive media space may be needed to store the backup image. The backup may be performed more efficiently, since less data is being written to the archive media. Additionally, if a recovery from the archive media is performed, the recovery may be more efficient since there is no need to perform the merge during the recovery.

Generally, the archive media may be any storage media that is used to store backup copies of the virtual machine images. For example, the archive media may include removable storage media such as tape, solid state storage, external hard disks, writeable CDs or DVDs, etc. The archive media may also include remote media, such as media on a backup server such as backup server 12.

The merge operation may generally capture the most recent update of a given block of the virtual disk and may write the most recent update to the merged base virtual disk file. Less recent updates, and the original copy in the base virtual disk file, may be discarded.

Figure 5:
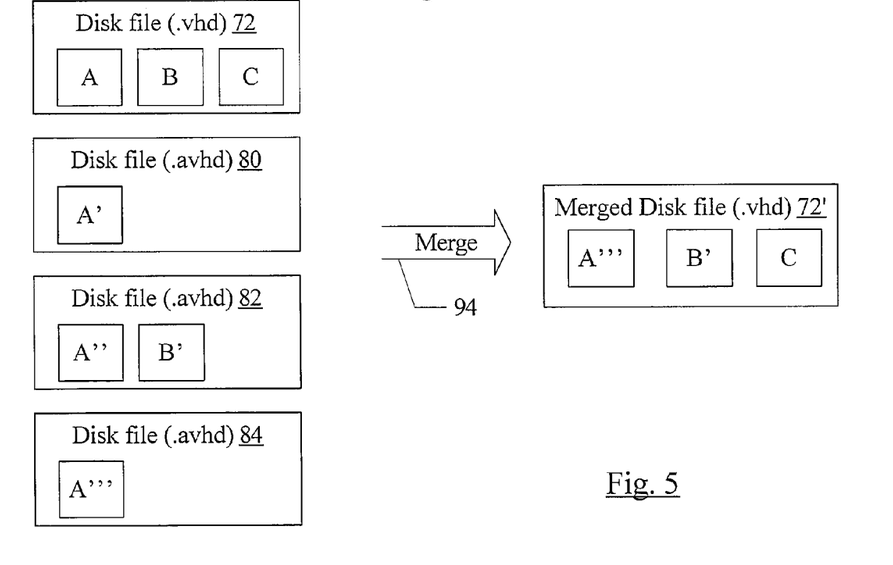
FIG. 5 is a block diagram illustrating one embodiment of merging incremental disk images for a virtual machine.

FIG. 5 is an example illustrating three blocks of the virtual disk (A, B, and C in the base virtual disk file 72 in FIG. 5). A first incremental virtual disk file 80 includes a first update of the block A (A' in FIG. 5). A second incremental virtual disk file 82 includes a second update of the block A, more recent than the first update (block A" in FIG. 5). Additionally, the second incremental virtual disk file 82 includes a first update of the block B (B' in FIG. 5). Finally, a third incremental virtual disk file 84 includes a third update of the block A, more recent than the second update (block A''' in FIG. 5). The merge operation (arrow 94) results in merged base virtual disk file 72 that includes the block A''' from the third incremental virtual disk file 84, the block B' from the second incremental virtual disk file 82, and the original block C (since the block C was not modified in any of the incremental virtual disk files 80, 82, or 84.

In one embodiment, the backup application 50 on the computer system 10 may perform the snapshot requests and the backups, and the archive media may be coupled to the computer system 10 to make the backup. In some such embodiments, the merging of the incremental virtual disk files into the base virtual disk file may result in modifying the virtual machine image 40 as well. Accordingly, granularity to the recovery points that have been merged may no longer be available. Additionally, performing the merge on the computer system 10 may consume execution cycles on the computer system 10, which may temporarily impede the continued execution of the virtual machines on the computer system 10.

In another embodiment, the backup application 50 may perform the snapshots on the computer system 10, but may perform the merge on a backup server 12. The backup application 50 on the backup server 12 may obtain the virtual machine image from the computer system 10 over the network 14. Alternatively, the storage device 22 may be a shared storage device between the computer system 10 and the backup server 12 (e.g. storage area network (SAN) storage or network attached storage (NAS) storage, etc.) and the backup server 12 may access the shared storage.

By performing the merge and the archive on the backup server 12, the computer system 10 may more rapidly continue with execution of the virtual machine 16A. Accordingly, performance in the execution of the virtual machines may be improved. Additionally, the incremental virtual disk images may be retained by the computer system 10, and thus granularity to the restore points may not be lost by the merge function.

To perform the merge on the backup server 12, the base virtual disk file 72 and the incremental virtual disk files 80, 82, 84, etc. may be imported by the VMM 18 on the backup server 12. Generally, importing the disk files may refer to reading the disk files from the storage into the VMM 18. The disk files may be imported by activating the virtual machine on the VMM 18, or the VMM 18 may read the files from the virtual machine image without activating the virtual machine. In one embodiment, the snapshots of the virtual disk may be made as VSS transportable snapshots. A VSS transportable snapshot is generated with the aid of VSS 54, and may include an XML document along with the data that describes the data. The VMM 18 on the backup server 12 may import the virtual disk using the XML document as a guide.

While the above discussion refers to archiving a current state of the virtual machine, other embodiments may archive any state. For example, the backup application 50 may archive any state corresponding to a snapshot of the virtual machine. The backup application 50 may invoke the merge function and merge the incremental virtual disk files up to the desired archive point, and may archive the resulting merged base virtual disk file (and other virtual machine state).

Figure 6:
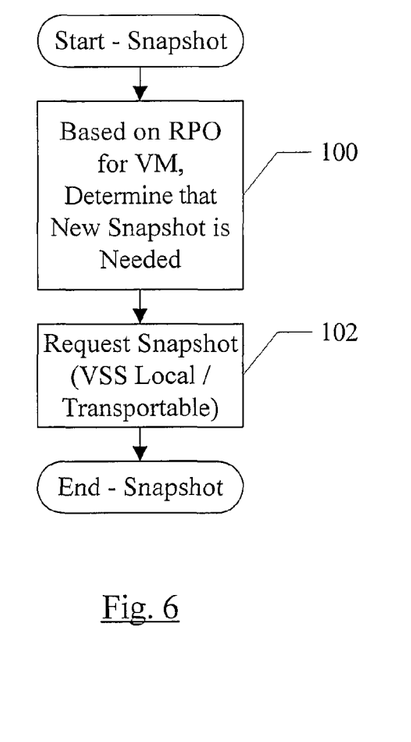
FIG. 6 is a flowchart illustrating operation of one embodiment of a backup application to request a snapshot.

Turning now to FIG. 6, a flowchart is shown illustrating operation of one embodiment of the backup application 50 to request a snapshot of the virtual disk. While the blocks are shown in a particular order for ease of understanding, other orders may be used. The backup application 50 may comprise instructions which, when executed, implement the operation shown in FIG. 6.

The backup application 50 may determine, based on the RPO for a virtual machine, that a new snapshot of the virtual machine's virtual disks is needed to meet the RPO (block 100). The backup application 50 may request the snapshot (block 102). In one embodiment, the request may be for a VSS transportable snapshot if a VSS transportable snapshot has not already been created. If a VSS transportable snapshot has been created, then the snapshot may be requested via the server management interface and the incremental virtual disk file may be created. In one embodiment, the request may be transmitted through the server management interface of the Hyper-V product. The Hyper-V product may interact with VSS to obtain the VSS transportable snapshot. Alternatively, the backup application 50 may request the VSS transportable snapshot directly. In embodiments in which the backup application 50 operates on the computer system 10 to merge the incremental virtual disk files into the base virtual disk file and to make the archive image of the virtual machine (i.e. the backup server 12 is not used), the snapshot may be a VSS local snapshot.

Figure 7:
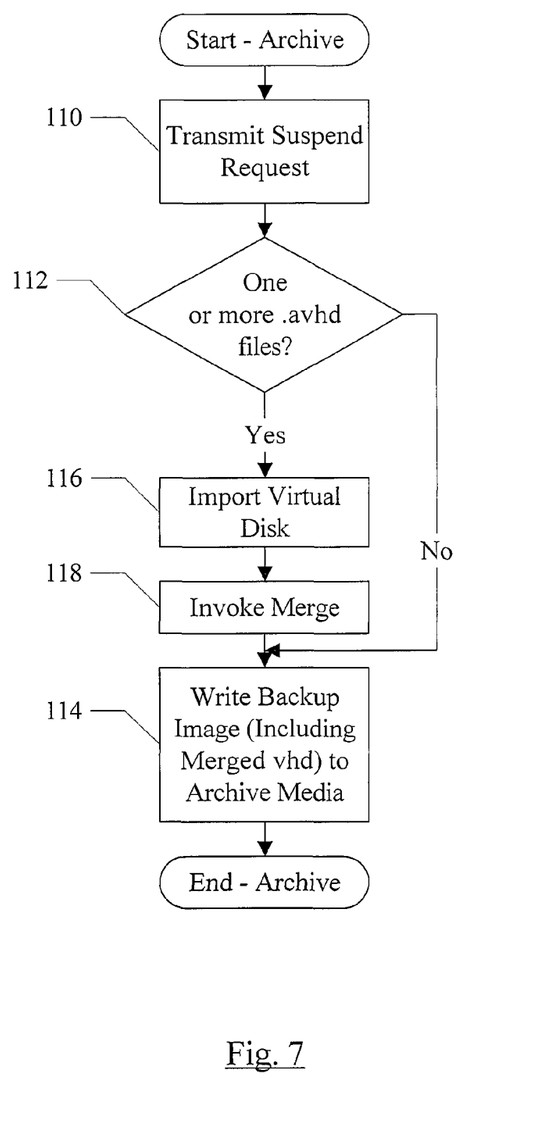
FIG. 7 is a flowchart illustrating operation of one embodiment of the backup application to archive a virtual machine snapshot.

Turning now to FIG. 7, a flowchart is shown illustrating operation of one embodiment of the backup application 50 to archive a virtual machine. While the blocks are shown in a particular order for ease of understanding, other orders may be used. The backup application 50 may comprise instructions which, when executed, implement the operation shown in FIG. 7.

The backup application 50 may transmit the suspend request to the VMM 18 (block 110). In response, the VMM 18 may update the virtual machine image 40 or 42 with the current state of the virtual machine. For each virtual disk in the virtual machine, the backup application 50 may determine if there are one or more incremental virtual disk files in the virtual machine image (decision block 112). If not (decision block 112, "no" leg), the backup application may write the virtual machine image as the backup image to the archive media (since no merging is needed—block 114). If there is one or more incremental virtual disk files, the backup application 50 may request that the VMM 18 import the virtual disk (block 116) and may invoke the merge function (block 118) to produce the backup image including the merged base virtual disk. The backup application 50 may write the backup image, including the merged base virtual disk, to the archive media (block 114).

Returning to FIG. 1, the storage medium 60 on the backup server 12 may be used to store the backups of the virtual machines 16A-16B. Generally, the storage medium 60 may be an archive medium, as described previously. In embodiments in which the backup server 12 is not implemented, the archive media may be provided to the computer system 10.

The virtual hardware in the virtual machine 16A (and other virtual machines such as the virtual machines 16B-16C) may be similar to the hardware 20 included in the computer system 10. For example, the virtual CPU 32 may implement the same instruction set architecture as the processor(s) in the hardware 20. In such cases, the virtual CPU 32 may be one or more data structures storing the processor state for the virtual machine 16A. The application and O/S software instructions may execute on the CPU(s) in the hardware 20 when the virtual machine 16A is scheduled for execution by the VMM 18. When the VMM 18 schedules the virtual machine 16A for execution, the VMM 18 may load the virtual CPU state 32 into the hardware CPU. Similarly, when the VMM 18 stops the virtual machine 16A to schedule another virtual machine for execution (e.g. the virtual machine 16B), the VMM 18 may write the state of the processor into the virtual CPU 32 data structure. Alternatively, the virtual CPU 32 may be different from the CPU(s) in the hardware 20. For example, the virtual CPU 32 may comprise software coded using instructions from the instruction set supported by the underlying CPU to emulate instruction execution according to the instruction set architecture of the virtual CPU 32. Alternatively, the VMM 18 may emulate the operation of the hardware in the virtual machine. Similarly, any virtual hardware in a virtual machine may be emulated in software if there is no matching hardware in the hardware 20.

Different virtual machines which execute on the same computer system 10 may differ. For example, the O/S 30 included in each virtual machine may differ. Different virtual machines may employ different versions of the same O/S (e.g. Microsoft Windows NT with different service packs installed), different versions of the same O/S family (e.g. Microsoft Windows NT and Microsoft Windows2000), or different O/Ss (e.g. Microsoft Windows NT, Linux, Sun Solaris, etc.).

Generally, the VMM 18 may be responsible for managing the virtual machines on a given computer system. The VMM 18 may schedule virtual machines for execution on the underlying hardware, using any scheduling scheme. For example, a time division multiplexed scheme may be used to assign time slots to each virtual machine. Additionally, the VMM 18 may handle the suspending and resuming of virtual machines responsive to suspend and resume commands. The commands may be received from a virtual machine, or may be communicated from another computer system. In one embodiment, the VMM may be the Hyper-V product available from Microsoft Corporation. The VMM may also be the ESX product available from VMware, Inc. (Palo Alto, Calif.). Other embodiments may include the Xen virtual machine monitor available as freeware, other virtual machine monitors available from Microsoft, etc.

In the illustrated embodiment, the VMM may execute directly on the underlying hardware (i.e. without an underlying operating system). In other embodiments, the VMM may be designed to execute within an operating system (e.g. as a hypervisor). For example, the GSX product available from VMware, Inc. may execute under various versions of Microsoft's Windows operating system and/or the Linux operating system. The Hyper-V product may include a hypervisor executing on the Window's operating system (e.g. Server 2008).

The storage device 22 may be any type of storage device to which the computer system 10 may be coupled. For example, the storage device 22 may comprise one or more fixed disk drives such as integrated drive electronics (IDE) drives, small computer system interface (SCSI) drives, etc. The fixed disk drives may be incorporated as peripherals of the computer system 10 through a peripheral bus in the computer system 10 such as the peripheral component interconnect (PCI) bus, USB, firewire, etc. Alternatively, the storage device 22 may couple to a network (e.g. network attached storage (NAS) or storage area network (SAN) technologies may be used). The storage device 22 may be included in file servers to which the computer system 10 has access. The storage device 22 may also be removable disk drives, memory, etc. Generally, a storage device is any device which is capable of storing data.

It is noted that, while each virtual machine illustrated in FIG. 1 includes one application, generally a virtual machine may include one or more applications. For example, in one embodiment a user may execute all applications which execute on the same underlying O/S 30 in the same virtual machine.

It is noted that the term "program", as used herein, refers to a set of instructions which, when executed, perform the function described for that program. The instructions may be machine level instructions executed by a CPU, or may be higher level instructions defined in a given higher level language (e.g. shell scripts, interpretive languages, etc.). The term "software" or "application" may be synonymous with "program".

Additional description of the VSS system is next provided. VSS was designed to attack the complex problem of open file management in backup applications. For example, gathering a consistent state for multiple files corresponding to a running application is difficult, as one file may be changed before the state is gathered and a corresponding change to another file may occur after the state is gathered. VSS is an OS service to provide consistent file state for backup. For example, Microsoft Windows Server™ 2003 and higher, Windows XP, and Windows Vista implement VSS, and future releases are expected to implement VSS as well.

As mentioned, the writers identified by VSS are part of applications or operating system services that are designed to interact with the VSS. For virtual machines, the VM that includes a virtual disk may be the writer of the file(s) representing the virtual disk. Additionally, VSS defines one or more requesters. The requester interacts with the VSS to obtain consistent sets of file data corresponding to the writers, shadow copies of volumes in a consistent state for backup, etc. The requestor may be the backup application 50, for example. Additionally, a set of providers create and maintain volumes and shadow copies of volumes on the physical storage devices (e.g. disk drives) in the computer system. A system provider is a default provider that is used if other providers are not included. A hardware provider is part of the storage system hardware and is designed to create shadow copies in response to requests from the VSS. A software provider is part of the OS or another application that provides the shadow copy functionality.

A backup operation through VSS generally includes the requester requesting that the VSS enumerate the writers and prepare for shadow copy creation. The writers respond to the VSS by describing the files that are to be backed up and also by describing the method to be used for restoring the files. In some cases, the files are not directly written back to their original location. For example, some files are placed in a temporary location, and a registry entry is created to restore the file to its proper location on reboot. The description of the files and/or restore methods is provided to the requestor (e.g. as the aforementioned extensible markup language (XML) document). The files are grouped into groups that are to be backed up as a unit. Each group of files identified by a writer is referred to as a "shadow copy component". The writers prepare their shadow copy components for backup (e.g. flushing writes from memory to disk, completing open transactions, rolling transaction logs, flushing caches, etc.). The VSS requests that the writers quiesce briefly while a shadow copy is created, and freezes the file system. The VSS then requests that the providers make a shadow copy of the volumes, and then permits the writers to continue operation with the original volume copy. The requester then makes a backup from the shadow copy.

During a subsequent restore of a backup copy, the backup program follows the restore description in the XML document provided from the VSS during the backup operation for the shadow copy components. While such a restore is performed when the backup program is executing in the client that was backed up, other types of backup/restore mechanisms may not perform the restore in this fashion.

Figure 8:
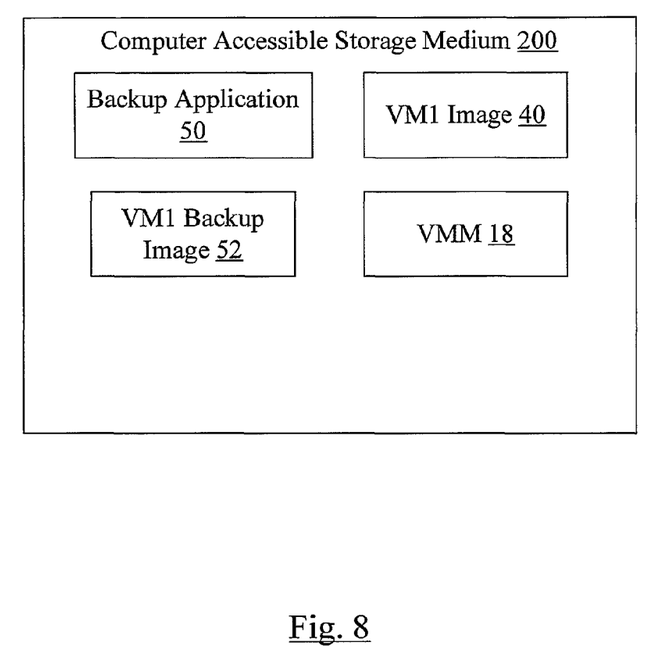
FIG. 8 is a block diagram of one embodiment of a computer accessible medium.

Turning now to FIG. 8, a block diagram of a computer accessible storage medium 200 is shown. Generally speaking, a computer accessible medium may include any media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., microelectromechanical systems (MEMS), etc. The media may be insertable into the computer, integrated into the computer (e.g. a fixed disk or RAM), or coupled to the computer via a communication medium such as a network and/or a wireless link. The computer accessible storage medium 200 in FIG. 8 may store one or more of the backup application 50, the virtual machine backup image 52, the virtual machine image 40, and/or the VMM 18. The backup application 50 and VMM 18 may comprise instructions which, when executed, implement the operation described herein for the respective components. Generally, the computer accessible storage medium 200 may store any set of instructions which, when executed, implement a portion or all of the flowcharts shown in one or more of FIGS. 6-7 and/or the operation illustrated in the examples of FIGS. 2-4. A carrier medium may include computer accessible storage media as well as transmission media such as wired or wireless transmission.

Figure 9:
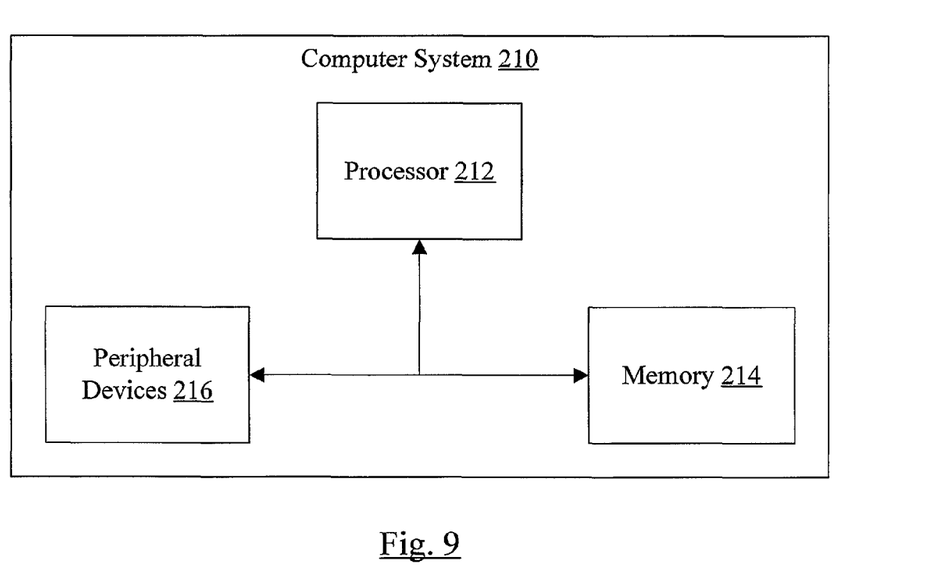
FIG. 9 is a block diagram of one embodiment of a computer system.

FIG. 9 is a block diagram of one embodiment of an exemplary computer system 210. In the embodiment of FIG. 9, the computer system 210 includes a processor 212, a memory 214, and various peripheral devices 216. The processor 212 is coupled to the memory 214 and the peripheral devices 216.

The processor 212 is configured to execute instructions, including the instructions in the software described herein. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to couple the processor 212, the memory 214, and the peripheral devices 216, creating multiple connections between these components.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use (including the instructions implementing the software described herein), data to be operated upon by the processor 212 during use (including the data structures described herein), etc.

Peripheral devices 216 may represent any sort of hardware devices that may be included in the computer system 210 or coupled thereto (e.g. storage devices, optionally including a computer accessible storage medium 200, other input/output (I/O) devices such as video hardware, audio hardware, user interface devices, networking hardware, etc.).

Numerous variations and modifications will become apparent to those skilled in the art once the above disclosure is fully appreciated. It is intended that the following claims be interpreted to embrace all such variations and modifications.

What is claimed is:

1. A method comprising:
    requesting one or more snapshots of a virtual machine according to a recovery point objective of the virtual machine, wherein a virtual machine monitor that controls the virtual machine responds to a request for snapshot by creating an incremental virtual disk file and directing subsequent disk write operations in the virtual machine to the incremental virtual disk file and by freezing a state of a previous virtual disk file, wherein the previous virtual disk file is either a base virtual disk file or another incremental virtual disk file, and wherein subsequent disk read operations in the virtual machine obtain data from a combination of the base virtual disk file and one or more incremental virtual disk files, and wherein the base virtual disk file and incremental virtual disk files remain on a storage device used by the virtual machine during operation and are used by the virtual machine during subsequent operation;
    to perform a backup of the virtual disk for the virtual machine, determining that the virtual disk is represented by the base virtual disk file and the one or more incremental virtual disk files;
    during the backup, invoking a merge operation to merge the one or more incremental virtual disk files into the base virtual disk file responsive to the determining, wherein the merge operation is performed from the one or more incremental virtual disk files on the storage device used by the virtual machine during execution and the base virtual disk file on the storage device used by the virtual machine during execution; and
    completing the backup by writing a backup image comprising the merged base virtual disk file to one or more archive media that are not used by the virtual machine during operation.

2. The method as recited in claim 1 further comprising requesting that the virtual machine be suspended prior to the determining, wherein the suspended virtual machine is represented by a virtual machine image written to a storage.

3. The method as recited in claim 2 wherein the base virtual disk file and the one or more incremental virtual disk files are part of the image, and wherein the image further comprises other virtual machine state, and wherein the backup image further comprises the other virtual machine state.

4. The method as recited in claim 1 wherein requesting the snapshot comprises requesting a volume shadow copy service portable snapshot.

5. The method as recited in claim 1 wherein the virtual machine executes on a first computer system, and wherein the determining, the invoking, and the writing are performed on the first computer system.

6. The method as recited in claim 1 wherein the virtual machine executes on a first computer system, and wherein the determining, the invoking, and the writing are performed on a second computer system coupled to the first computer system.

7. The method as recited in claim 1 further comprising, subsequent to the backup, using the one or more incremental virtual disk files and the base virtual disk file during execution of the virtual machine.

8. A non-transitory computer accessible storage medium storing a plurality of instructions which, when executed:
    request one or more snapshots of a virtual machine according to a recovery point objective of the virtual machine, wherein a virtual machine monitor that controls the virtual machine responds to a request for snapshot by creating an incremental virtual disk file and directing subsequent disk write operations in the virtual machine to the incremental virtual disk file and by freezing a state of a previous virtual disk file, wherein the previous virtual disk file is either a base virtual disk file or another incremental virtual disk file, and wherein subsequent disk read operations in the virtual machine obtain data from a combination of the base virtual disk file and one or more incremental virtual disk files, and wherein the base virtual disk file and incremental virtual disk files remain on a storage device used by the virtual machine during operation and are used by the virtual machine during subsequent operation;

to perform a backup of the virtual disk for the virtual machine, the plurality of instructions, when executed, determine that the virtual disk is represented by the base virtual disk file and the one or more incremental virtual disk files;

during the backup, the plurality of instructions invoke a merge operation to merge the one or more incremental virtual disk files into the base virtual disk file responsive to the determining, wherein the merge operation is performed from the one or more incremental virtual disk files on the storage device used by the virtual machine during execution and the base virtual disk file on the storage device used by the virtual machine during execution; and the plurality of instructions complete the backup by writing a backup image comprising the merged base virtual disk file to one or more archive media that are not used by the virtual machine during operation.

9. The non-transitory computer accessible storage medium as recited in claim 8 wherein the plurality of instructions, when executed, request that the virtual machine be suspended prior to the determining, wherein the suspended virtual machine is represented by a virtual machine image written to a storage.

10. The non-transitory computer accessible storage medium as recited in claim 9 wherein the base virtual disk file and the one or more incremental virtual disk files are part of the image, and wherein the image further comprises other virtual machine state, and wherein the backup image further comprises the other virtual machine state.

11. The non-transitory computer accessible storage medium as recited in claim 8 wherein the snapshot is a volume shadow copy service portable snapshot.

12. The non-transitory computer accessible storage medium as recited in claim 8 wherein the virtual machine executes on a first computer system, and wherein the plurality of instructions also execute on the first computer system.

13. The non-transitory computer accessible storage medium as recited in claim 8 wherein the virtual machine executes on a first computer system, and wherein the plurality of instructions execute on a second computer system coupled to the first computer system.

14. The non-transitory computer accessible storage medium as recited in claim 8 wherein the virtual machine, during execution, uses the one or more incremental virtual disk files and the base virtual disk file subsequent to the backup.

15. A computer system comprising:
hardware configured to execute instructions; and
a storage device coupled to the hardware, the storage device storing a virtual machine monitor executable by the hardware and a virtual machine schedulable by the virtual machine monitor to execute on the hardware, wherein the virtual machine comprises at least one virtual disk accessed by software encapsulated in the virtual machine, wherein the storage device further stores a backup application which, when executed, requests one or more snapshots of a virtual machine according to a recovery point objective of the virtual machine, wherein the virtual machine monitor responds to a request for snapshot by creating an incremental virtual disk file and directing subsequent disk write operations in the virtual machine to the incremental virtual disk file and by freezing a state of a previous virtual disk file, wherein the previous virtual disk file is either a base virtual disk file or another incremental virtual disk file, and wherein subsequent disk read operations in the virtual machine obtain data from a combination of the base virtual disk file and one or more incremental virtual disk files, and wherein the base virtual disk file and incremental virtual disk files remain on the storage device and are used by the virtual machine during subsequent operation, and to perform a backup of the virtual disk for the virtual machine, the backup application determines that the virtual disk is represented by the base virtual disk file and the one or more incremental virtual disk files, and wherein the backup application, when executed during the backup, invokes a merge operation to merge the one or more incremental virtual disk files into the base virtual disk file, wherein the merge operation is performed from the one or more incremental virtual disk files on the storage device used by the virtual machine during execution and the base virtual disk file on the storage device used by the virtual machine during execution, and wherein the backup application completes the backup by writing a backup image comprising the merged base virtual disk file to one or more archive media.

16. The computer system as recited in claim 15 wherein the backup application executes on the computer system.

17. The computer system as recited in claim 15 wherein the backup application executes on a second computer system coupled to the computer system.

18. The computer system as recited in claim 15 wherein the virtual machine, during execution, uses the one or more incremental virtual disk files and the base virtual disk file subsequent to the backup.

* * * * *